US009365430B2

(12) United States Patent
Lai et al.

(10) Patent No.: US 9,365,430 B2
(45) Date of Patent: Jun. 14, 2016

(54) METHOD OF MAKING M41S FAMILY MOLECULAR SIEVE

(75) Inventors: Wenyih Frank Lai, Bridgewater, NJ (US); Robert Ellis Kay, Easton, PA (US); Stephen John McCarthy, Center Valley, PA (US)

(73) Assignee: ExxonMobil Chemical Patents Inc., Baytown, TX (US)

(*) Notice: Subject to any disclaimer, the term of this patent is extended or adjusted under 35 U.S.C. 154(b) by 868 days.

(21) Appl. No.: 12/738,050

(22) PCT Filed: Jul. 30, 2008

(86) PCT No.: PCT/US2008/078310
§ 371 (c)(1),
(2), (4) Date: Jul. 15, 2010

(87) PCT Pub. No.: WO2009/055215
PCT Pub. Date: Apr. 30, 2009

(65) Prior Publication Data
US 2010/0280290 A1   Nov. 4, 2010

Related U.S. Application Data

(60) Provisional application No. 60/983,000, filed on Oct. 26, 2007, provisional application No. 60/983,009, filed on Oct. 26, 2007.

(51) Int. Cl.

| | | |
|---|---|---|
| C01B 37/00 | (2006.01) | |
| C01B 39/00 | (2006.01) | |
| B01J 29/54 | (2006.01) | |
| C01B 37/02 | (2006.01) | |
| B01J 29/83 | (2006.01) | |
| B01J 29/76 | (2006.01) | |
| C01B 39/54 | (2006.01) | |
| B01J 29/84 | (2006.01) | |
| B01J 29/03 | (2006.01) | |
| B01J 29/85 | (2006.01) | |
| B01J 29/04 | (2006.01) | |
| C01B 39/48 | (2006.01) | |
| B01J 29/70 | (2006.01) | |
| B01J 29/82 | (2006.01) | |
| C01B 37/04 | (2006.01) | |
| C01B 37/06 | (2006.01) | |
| C01B 37/08 | (2006.01) | |

(52) U.S. Cl.
CPC ............ *C01B 37/02* (2013.01); *B01J 29/0308* (2013.01); *B01J 29/0333* (2013.01); *B01J 29/041* (2013.01); *B01J 29/044* (2013.01); *B01J 29/70* (2013.01); *B01J 29/76* (2013.01); *B01J 29/82* (2013.01); *B01J 29/83* (2013.01); *B01J 29/84* (2013.01); *B01J 29/85* (2013.01); *C01B 37/005* (2013.01); *C01B 37/04* (2013.01); *C01B 37/06* (2013.01); *C01B 37/065* (2013.01); *C01B 37/08* (2013.01); *C01B 39/48* (2013.01); *C01B 39/54* (2013.01); *B01J 2229/42* (2013.01)

(58) Field of Classification Search
CPC ...... C01B 37/02; C01B 37/005; C01B 37/04; C01B 37/06; C01B 37/065; C01B 37/08; C01B 39/48; C01B 39/54; B01J 29/0308; B01J 29/0333; B01J 29/041; B01J 29/044; B01J 29/70; B01J 29/76; B01J 29/82; B01J 29/83; B01J 29/84; B01J 29/85; B01J 2229/42

See application file for complete search history.

(56) References Cited

U.S. PATENT DOCUMENTS

| | | |
|---|---|---|
| 4,176,090 A | 11/1979 | Vaughan et al. |
| 4,216,188 A | 8/1980 | Shabtai et al. |
| 4,248,739 A | 2/1981 | Vaughan et al. |
| 4,367,163 A | 1/1983 | Pinnavaia et al. |
| 4,831,006 A | 5/1989 | Aufdembrink |

(Continued)

FOREIGN PATENT DOCUMENTS

EP   0 205 711   12/1986

OTHER PUBLICATIONS

Zhao et al, "Synthesis and characterization of highly ordered MCM-41 in an alkali-free system and its catalytic activity", Catalysis Letters 38 (1996) 33-37.*
"Periodic table of the elements," Chemical and Engineering News, vol. 63, Issue (5), p. 27 (1985).
Y. Ahn et al., "Fabrication of honeycomb structures with powder MCM-48 silica," Stud. Surf. Sci. Catal., vol. 135, No. 318, 2001, XP002506057.

(Continued)

*Primary Examiner* — David M Brunsman
(74) *Attorney, Agent, or Firm* — Darryl M. Tyus

(57) ABSTRACT

This disclosure relates to a novel method of making and recovering M41S family molecular sieve materials using synthesis mixtures having high solids-content and without a purification step. The solids-content, for example, is in a range from about 20 wt. % to 50 wt. %. The method also includes the step of mixing at least a portion of the M41S made with another material to form a composition, wherein the amount of said material to be mixed with said M41S product is such that said composition having less than 10 wt. % free fluid. The material mixed with the M41S made includes metal oxides, metal nitrides, metal carbides and mixtures thereof, as well as absorptive material capable of absorbing mother liquor and selected from the group consisting of carbon silica, alumina, titania, zirconia and mixtures thereof. The amount of the wastewater generated by this novel method is reduced by at least 50% to as much as 100% as comparing with conventional method of making M41S materials. By reducing and/or eliminating at least a portion of the wastewater generated in the synthesis product, the new method reduces cost of making of M41S materials and provides a more environmentally-friendly synthesis product.

27 Claims, No Drawings

(56) References Cited

U.S. PATENT DOCUMENTS

| | | | |
|---|---|---|---|
| 4,859,648 A | | 8/1989 | Landis et al. |
| 5,057,296 A | | 10/1991 | Beck |
| 5,098,684 A | | 3/1992 | Kresge et al. |
| 5,198,203 A | | 3/1993 | Kresge et al. |
| 5,211,934 A | | 5/1993 | Kresge et al. |
| 5,246,689 A | | 9/1993 | Beck et al. |
| 5,258,114 A | | 11/1993 | Aufdembrink et al. |
| 5,366,945 A | | 11/1994 | Kresge et al. |
| 5,378,440 A | * | 1/1995 | Herbst et al. ............. 423/210 |
| 6,042,807 A | | 3/2000 | Faraj |
| 2002/0074263 A1 | * | 6/2002 | Shan et al. ............. 208/134 |
| 2005/0085646 A1 | * | 4/2005 | Muller et al. ............. 549/523 |
| 2006/0052233 A1 | * | 3/2006 | Beeckman et al. ............. 502/60 |
| 2006/0293169 A1 | | 12/2006 | Srinivasan et al. |

OTHER PUBLICATIONS

X. S. Zhao et al., "Synthesis and characterization of highly ordered MCM-41 in an alkali-free system and its catalytic activity," Catalysis Letters, vol. 38, No. 1-2, 2004, pp. 33-37, XP002506058.

R. A. A. Melo et al., "MCM-41 Ordered Mesoporous Molecular Sieves Synthesis and Characterization," Materials Research, vol. 2, No. 3, 1999, pp. 173-179, XP002506059.

X. M. Tai et al., "A Novel Method for the Synthesis of Mesoporous Molecular Sieve MCM-41," Chinese Chemical Letters, vol. 16, No. 6, 2005, pp. 843-845, XP002506060.

R. Ryoo et al., "Synthesis of highly ordered MCM-41 by micelle-packing control with mixed surfactants," Chemical Commun , vol. 9/04355A, 1999, pp. 1413-1414, XP002506061.

\* cited by examiner

METHOD OF MAKING M41S FAMILY MOLECULAR SIEVE

CROSS-REFERENCE TO RELATED APPLICATIONS

This application is a national stage filing of International Patent Cooperation Treaty Application No. PCT/US2008/078310 filed Sep. 30, 2008, which claims the benefit of and priority to U.S. Provisional patent application Ser. Nos. 60/983,000, filed Oct. 26, 2007, and 60/983,009, filed Oct. 26, 2007, the disclosure of which is fully incorporated herein by reference.

FIELD OF THE INVENTION

This disclosure relates to methods of making M41S family molecular sieve materials using synthesis mixtures having high solids-content, particularly but not exclusively, to methods characterized by eliminating the purification step(s), e.g., washing and/or filtration, of the synthesis product.

BACKGROUND OF THE INVENTION

Porous inorganic solids have found great utility as catalysts and separations media for industrial applications. The openness of their microstructure allows molecules access to the relatively large surface areas of these materials that enhance their catalytic and sorptive activities. The porous materials in use today can be sorted into three broad categories using the details of their microstructure as a basis for classification. These categories are the amorphous and paracrystalline materials, the crystalline molecular sieves and modified layered materials. The detailed differences in the microstructures of these materials manifest themselves as important differences in the catalytic and sorptive behavior of the materials, as well as in differences in various observable properties used to characterize them, such as their surface areas, the sizes of pores and the variability in those sizes, the presence or absence of X-ray diffraction (XRD) patterns and the details in such patterns, and the appearance of the materials when their microstructure is studied by transmission electron microscopy and electron diffraction methods.

The M41S family mesoporous molecular sieve is described in J. Amer. Chem. Soc., 1992, 114, 10834. Members of the M41S family mesoporous molecular sieve include MCM-41, MCM-48 and MCM-50. A member of this class is MCM-41 whose preparation is described in U.S. Pat. No. 5,098,684. MCM-41 is characterized by having a hexagonal structure with a uni-dimensional arrangement of pores having a cell diameter greater than about 13 Angstroms. The physical structure of MCM-41 is like a bundle of straws wherein the opening of the straws (the cell diameters of the pores) ranges from about 13 to 200 Angstroms. MCM-48 has a cubic symmetry and is described for example in U.S. Pat. No. 5,198,203. MCM-50 has a layered or lamellar structure and is described in U.S. Pat. No. 5,246,689.

The M41S family mesoporous molecular sieves are often prepared from aqueous reaction mixtures (synthesis mixtures) comprising sources of appropriate oxides. Organic agents, such as surfactant(s), may also be included in the synthesis mixture for the purpose of influencing the production of the M41S family mesoporous molecular sieves having the desired structure and channel size. After the components of the synthesis mixture are properly mixed with one another, the synthesis mixture is subjected to appropriate crystallization conditions in an autoclave. Such conditions usually involve heating of the synthesis mixture to an elevated temperature possibly with stirring. Room temperature aging of the synthesis mixture is also desirable in some instances.

After the crystallization of the synthesis mixture is complete, the crystalline product may be recovered from the remainder of the synthesis mixture, especially the liquid contents thereof. Such recovery may involve filtering the crystals and washing these crystals with fluids, such as, water. However, in order to remove the entire undesired residue of the synthesis mixture from the crystals, it is often necessary to subject the crystals to a high temperature calcination e.g., at 540° C., possibly in the presence of oxygen. Such a calcination treatment not only removes water from the crystals, but this treatment also serves to decompose and/or oxidize the residue of the organic directing agent which may be occluded in the pores of the crystals, possibly occupying ion exchange sites therein.

The M41S family mesoporous molecular sieve may be characterized by its structure, including extremely large pore windows, and high sorption capacity. The M41S family mesoporous molecular sieve found many applications, such as catalytic cracking, adsorption, separation, oxidation, polymerization, and pharmaceutics. However, the process of synthesizing the M41S family mesoporous molecular sieve needs expensive surfactant. In particular, costs for disposal surfactant-containing wastewater generated in the crystallization, filtration, and washing is high. It is therefore a need to improve the method of synthesizing the M41S family mesoporous molecular sieve by lowering the production cost, such as minimizing the wastewater by eliminating the filtration/washing step.

U.S. Pat. application No. 60/899,785 relates to a method for synthesizing a mesoporous molecular sieve composition, which is characterized by that at least a portion of the solvent or solvent mixture in the reaction mixture comprises wastewater from processing of the mesoporous molecular sieve made in previous synthesis batch(es), e.g., the mother liquor(s), the washing liquid(s), the cleaning liquid(s), and any combination thereof We found a novel method of making M41S materials using synthesis mixture having high solids-content. This novel method has the advantage of making high quality M41S materials and reducing at least 50%, or even 100% of wastewater containing surfactant(s), such as, mother liquor, formed in the synthesis. Another advantage of this novel method is that it minimizes or eliminates the filtration and/or washing step(s) of the synthesis. The amount of the wastewater containing surfactant(s) generated by this novel method is reduced by at least 50% to as much as 100% as comparing with conventional method of making M41S materials. The as-synthesized M41S product of this novel method displayed similar structure and surface area as compared with the M41S product obtained with filtration and/or washing step(s). By reducing and/or eliminating at least a portion of the wastewater generated in the synthesis, the new method reduces cost of synthesizing of M41S materials and provides an environmental friendly synthesizing process.

SUMMARY OF THIS INVENTION

In some embodiments, this disclosure relates to a method for synthesizing a composition of matter comprising an inorganic, porous crystalline phase material having, after calcination, a hexagonal arrangement of uniformly-sized pores having diameters of at least about 13 Angstrom Units and exhibiting a hexagonal electron diffraction pattern that can be indexed with a $d_{100}$ value greater than about 18 Angstrom Units, which comprises:

(a) preparing a mixture capable of forming the composition, the mixture comprising sources of one or a combination of oxides selected from the group consisting of divalent element W, trivalent element X, tetravalent element Y and pentavalent element Z, an organic (R) directing agent and solvent or solvent mixture, and having a composition, in terms of mole ratios, within the following ranges:

| | |
|---|---|
| $X_2O_3/YO_2$ | 0 to 0.5 |
| $X_2O_3/(YO_2 + Z_2O_5)$ | 0 to 100 |
| $X_2O_3/(YO_2 + WO + Z_2O_5)$ | 0 to 100 |
| Solvent/$(YO_2 + WO + Z_2O_5 + X_2O_3)$ | 1-1000, 1-50, or 2 to 10 |
| $OH^-/YO_2$ | 0 to 10 |
| $M_{2/e}O/(YO_2 + WO + Z_2O_5 + X_2O_3)$ | 0 to 10 |
| $R_{2/f}O/(YO_2 + WO + Z_2O_5 + X_2O_3)$ | 0.01 to 2.0 | wherein e and f are the weighted average valences of M and R, respectively, M is an alkali or alkaline earth metal ion and R comprises an ion of the formula $R_1R_2R_3R_4Q^+$, wherein Q is nitrogen or phosphorus and wherein at least one of $R_1$, $R_2$, $R_3$ and $R_4$ is selected from the group consisting of aryl of from 6 to about 36 carbon atoms, alkyl of from 6 to about 36 carbon atoms and combinations thereof, the remainder of $R_1$, $R_2$, $R_3$ and $R_4$ being selected from the group consisting of hydrogen, alkyl of from 1 to 5 carbon atoms and combinations thereof;

(b) maintaining the mixture under sufficient conditions of pH, temperature and time for formation of the composition of matter; and (c) recovering the composition of matter without purification step.

In one or more embodiments, the method further comprises the step of mixing at least a portion of the composition of matter with another material, either before or after the recovering step, wherein the amount of the material to be mixed with the composition of matter is such that the composition of matter having less than 10 wt. % free fluid, preferably less than 5 wt. % free fluid, more preferably less than 1 wt. % free fluid.

The material may be any suitable compound capable of to produce a composition of matter having less than 10 wt. % free fluid.

In some embodiments, the material comprises at least one of oxide of an element selected from group 1 to group 17 of the periodic table and mixtures thereof. In a preferred embodiment, the material comprises at least one of silica, alumina, titania, zirconia.

In other embodiments, the material comprises absorptive materials capable of absorbing mother liquor, including, but not limited to carbon, silica-alumina, silica-magnesia, silica-zirconia, silica-thoria, silica-beryllia, silica-titania as well as ternary compositions such as silica-alumina-thoria, silica-alumina-zirconia silica-alumina-magnesia and silica-magnesia-zirconia, and mixtures thereof.

In still other embodiments, the material is selected from the group consisting of metal oxides, metal nitrides, metal carbides and mixtures thereof.

In one or more aspects, this disclosure relates to a method for synthesizing a composition of matter comprising an inorganic, porous crystalline phase material having, after calcination, a hexagonal arrangement of uniformly-sized pores having diameters of at least about 13 Angstrom Units and exhibiting a hexagonal electron diffraction pattern that can be indexed with a $d_{100}$ value greater than about 18 Angstrom Units, which comprises:

(a) preparing a reaction mixture capable of forming the composition, the reaction mixture comprising sources of an oxide of silicon or a combination of oxides selected from the group consisting of silicon and aluminum, an organic (R) directing agent and solvent or solvent mixture, and having a composition, in terms of mole ratios, within the following ranges:

| | |
|---|---|
| $Al_2O_3/SiO_2$ | 0 to 0.5 |
| Solvent/$(SiO_2 + Al_2O_3)$ | 2 to 10 |
| $OH^-/SiO_2$ | 0 to 10 |
| $M_{2/e}O/(SiO_2 + Al_2O_3)$ | 0 to 5 |
| $R_{2/f}O/(SiO_2 + Al_2O_3)$ | 0.01 to 2.0 | wherein e and f are the weighted average valences of M and R, respectively, M is an alkali or alkaline earth metal ion and R comprises an ion of the formula $R_1R_2R_3R_4Q^+$, wherein Q is nitrogen or phosphorus and wherein at least one of $R_1$, $R_2$, $R_3$ and $R_4$ is selected from the group consisting of aryl of from 6 to about 36 carbon atoms, alkyl of from 6 to about 36 carbon atoms and combinations thereof, the remainder of $R_1$, $R_2$, $R_3$ and $R_4$ being selected from the group consisting of hydrogen, alkyl of from 1 to 5 carbon atoms and combinations thereof, the step (a) comprising (1) mixing the organic (R) directing agent with the solvent or solvent mixture such that the mole ratio of solvent/$R_{2/f}O$ is within the range of from about 50 to about 800, (2) adding to the mixture of step (a)(1) the sources of oxides, such that the ratio of $R_{2/f}O/(SiO_2+Al_2O_3)$ is within the range of from about 0.01 to about 2.0, (3) agitating the mixture resulting from step (a)(2) at a temperature of from about 20° C. to about 40° C. and optionally (4) aging the mixture resulting from step (a)(3) at a temperature of from about 20° C. to about 100° C. for from about 10 minutes to about 24 hours;

(b) maintaining the mixture under sufficient conditions of pH, temperature and time for formation of the composition of matter; and (c) recovering the composition of matter without purification step.

In one or more embodiments, the method further comprises the step of mixing at least a portion of the composition of matter with another material, either before or after a separation and/or recovering step, wherein the amount of the material to be mixed with the composition of matter is such that the composition of matter having less than 10 wt. % free fluid, preferably less than 5 wt. % free fluid, more preferably less than 1 wt. % free fluid.

The material may be any suitable compound capable of to produce a composition of matter having less than 10 wt. % free fluid.

In some embodiments, the material comprises at least one of oxide of an element selected from group 1 to group 17 of the periodic table and mixtures thereof. In a preferred embodiment, the material comprises at least one of silica, alumina, titania, zirconia and mixtures thereof.

In other embodiments, the material comprises absorptive materials capable of absorbing mother liquor, including, but not limited to carbon silica, alumina, titania, zirconia and mixtures thereof.

In still other embodiments, the material comprises metal oxides, metal nitrides, metal carbides and mixtures thereof.

In one aspect of this disclosure, the mixture comprises an additional organic directing agent ion R of the formula $R_1R_2R_3R_4Q^+$, wherein $R_1$, $R_2$, $R_3$ and $R_4$ are selected from the group consisting of hydrogen, alkyl of 1 to 5 carbon atoms and combinations thereof.

In other aspects of this disclosure, R comprises an organic agent selected from the group consisting of cetyltrimethylammonium, octadecyltrimethylammonium, benzyltrimethylammonium, cetylpyridinium, myristyltrimethylammonium, decyltrimethylammonium, dodecyltrimethylammonium and dimethyldidodecylammonium.

In other aspects of this disclosure, the $R_1$, $R_2$, $R_3$ and $R_4$ are selected from the group consisting of —$C_6H_{13}$, —$C_{10}H_{21}$, —$C_{12}H_{25}$, —$C_{14}H_{29}$, —$C_{16}H_{33}$, —$C_{18}H_{37}$ and combinations thereof.

In some embodiments, the method of this disclosure further comprises a step of adding to the reaction mixture an auxiliary organic selected from the group consisting of: (1) aromatic hydrocarbons and amines of from 5 to 20 carbons and halogen- and $C_1$-$C_{14}$ alkyl-substituted derivatives thereof; (2) cyclic aliphatic hydrocarbons and amines of from 5 to 20 carbons and halogen- and $C_1$-$C_{14}$ alkyl-substituted derivatives thereof; (3) polycyclic aliphatic hydrocarbons and amines of from 6 to 20 carbons and halogen- and $C_1$-$C_{14}$ alkyl-substituted derivatives thereof; (4) straight and branched aliphatic hydrocarbons and amines of from 3 to 16 carbons and halogen-substituted derivatives thereof; and (5) combinations thereof, and having a composition, in terms of mole ratios, within the following ranges:

| | |
|---|---|
| Auxiliary Organic/$YO_2$ | 0.05 to 20 |
| Auxiliary Organic/$R_{2/f}O$ | 0.02 to 100 |

In some aspects of this disclosure, the auxiliary organic is selected from the group consisting of: pentane; hexane; heptane; octane; nonane; decane; dodecane; dihalooctane; p-xylene; trimethylbenzene; triethylbenzene; dimethyladamantane; benzene; alkyl-substituted benzene; alkyl-substituted adamantine; and combinations thereof, alkyl being of from 1 to about 14 carbon atoms.

In some embodiments, the solids-content of a synthesis mixture is at least 15 wt. %, preferably at least 18 wt. %, more preferably at least 20 wt. %, even more preferably at least 25 wt. %, and most preferably at least 30 wt. %. The solids-content useful in this invention includes a range from at least about 15 wt. %, preferably at least about 18 wt. %, more preferably at least about 20 wt. %, even more preferably at least about 25 wt. %, and most preferably at least about 30 wt. % to less than 50 wt. %, preferably less than about 45 wt. %, more preferably less than about 40 wt. %, and most preferably less than about 35 wt. %. In other embodiments, the mixture has a solids-content in the range of 20 to 50 wt. %, preferably in the range of 25 to 35 wt. %

These and other facets of the present invention shall become apparent from the following detailed description, figure, and appended claims.

DETAILED DESCRIPTION OF THIS INVENTION

Introduction

This disclosure relates to a novel process that debottlenecks the synthesizing of the M41S material with reduced wastewater generated from the synthesis by using a high solids crystallization formulation. The crystallization step of this disclosure may be conveniently conducted in an autoclave reactor. The resulting M41S may be used in many catalytic processes. This new high solid crystallization procedure offers several advantages over the conventional low (solids-content less than 5 wt. %) to medium (solids-content less than about 15 wt. %) solids-content crystallization methods, including significantly lower production of wastewater containing surfactant, by reducing the amount of mother liquor produced in the synthesis and significantly simplifying the synthesizing process by minimizing or eliminating the filtration and/or the washing step(s), which also reduces the amount of wastewater produced in the synthesis. By using high solids crystallization formulation of this disclosure, the amount of wastewater produced in the synthesis is reduced by at least 50%.

In one or more embodiments, the method further comprises the step of mixing at least a portion of the composition of matter with another material, either before or after the recovering step, wherein the amount of the material to be mixed with the composition of matter is such that the composition of matter having less than 10 wt. % free fluid, preferably less than 5 wt. % free fluid, more preferably less than 1 wt. % free fluid. The material may be any suitable compound capable of to produce a composition of matter having less than 10 wt. % free fluid.

For the purposes of this disclosure and the claims thereto, a catalytically active material may be interchangeably referred to as a catalytic material, or a catalyst. The term "catalyst" is art-recognized and refers to any substance that notably affects the rate of a chemical reaction without itself being consumed or significantly altered. A catalyst system comprises a catalyst and a support. A reactor is any container(s) in which a chemical reaction occurs. As used in this specification, the term "framework type" is used in the sense described in the "Atlas of Zeolite Framework Types," 2001. As used herein, the numbering scheme for the Periodic Table Groups is used as in Chemical and Engineering News, 63(5), 27 (1985).

Unless otherwise stated in this disclosure, all percentages, parts, ratios, etc., are by weight. A reference to a compound or component includes the compound or component by itself, as well as in combination with other compounds or components, such as mixtures of compounds.

When numerical lower limits and numerical upper limits are listed herein, ranges from any lower limit to any upper limit are contemplated. The articles "a" and "an" are used herein to refer to one or more than one (i.e., at least one) of the grammatical object of the article. By way of example, "an element" means one element or more than one element. The terms "comprise" and "comprising" are used in the inclusive, open sense, meaning that additional elements may be included. The term "including" is used to mean "including but not limited to". "Including" and "including but not limited to" are used interchangeably.

For the purposes of this application, a working definition of "porous" is a material that adsorbs at least 1 gram of a small molecule, such as Ar, $N_2$, n-hexane, benzene or cyclohexane, per 100 grams of the solid.

The term "mesoporous" is used here to indicate crystals having substantially uniform pores within the range of from about 13 Angstroms to about 200 Angstroms in diameter. The materials hereby prepared will have substantially uniform pores within the range of from about 13 Angstroms to about 200 Angstroms, more usually from about 15 Angstroms to about 100 Angstroms in diameter.

The term "substantially uniform" as used herein, means regular arrangement and uniformity of size (pore size distribution within a single phase of, for example, ±25%, usually ±15% or less of the average pore size of that phase).

The term purification step as used herein, means step or steps for purify the product of the crystallization process. Examples of the purification steps are washing and filtration steps.

A porous material or particle having pores in the mesoporous range comprises pores with a diameter at the surface of the particle of greater than or equal to about 13 angstroms (Å) and less than or equal to about 200 Å. Pore size is the maximum perpendicular cross-sectional pore dimension of the material. Pore wall thickness is the average thickness between pores as measured perpendicular to the pore wall surface. For purposes of this disclosure, pore wall thickness is determined by multiplying the $d_{100}$ peak value in angstroms by 1.155 and then subtracting the average pore diameter in angstroms (as determined by the BJH adsorption plot of nitrogen adsorption). In the event that the $d_{100}$ is obscured or otherwise unavailable, then the pore wall thickness is determined by multiplying the $d_{200}$ peak value in angstroms by 2.31 and then subtracting the average pore diameter in angstroms (as determined by the BJH adsorption plot of nitrogen adsorption). In the event that the $d_{100}$ and $d_{200}$ peaks are obscured or otherwise unavailable, then the pore wall thickness is determined by multiplying the $d_{300}$ peak value in angstroms by 3.465 and then subtracting the average pore diameter in angstroms (as determined by the BJH adsorption plot of nitrogen adsorption).

The term "crystalline phase material" as used herein means a material providing a diffraction pattern with at least one peak by X-ray, electron or neutron diffraction, following calcination, such as $d_{100}$, $d_{200}$, $d_{300}$, and/or $d_{110}$.

The term "hexagonal" is intended to encompass not only materials that exhibit mathematically perfect hexagonal symmetry within the limits of experimental measurement, but also those with significant observable deviations from that ideal state. A working definition as applied to the microstructure of the present disclosure would be that six nearest neighbor channels at roughly the same distance would surround most channels in the material. However, defects and imperfections may cause significant numbers of channels to violate this criterion to varying degrees, depending on the quality of the material's preparation. Samples which exhibit as much as +/−25% random deviation from the average repeat distance between adjacent channels still clearly give recognizable images of the present ultra-large pore materials. Comparable variations are also observed in the $d_{100}$ values from the electron diffraction patterns.

The term "free fluid" as used herein means fluid not chemically or physically bound to the molecular sieve. The amount of free fluid is measured at 25° C. and 101.3 kPa-a. The weight percentage of free fluid in any mixture or crystallization product may be calculated by the weight of total free fluid at 25° C. and 101.3 kPa-a divided by the total weight of the mixture or crystallization product.

One factor affecting the synthesis of a crystalline molecular sieve is the solids-content in a synthesis mixture. The term "solids-content" used herein means the weight ratio of the tetravalent element and the trivalent element when present in the synthesis mixture, expressed in terms of their oxides, over the water in the synthesis mixture in weight percentage (wt. %). It can be measured by dividing the weight of the oxides in the synthesis mixture by the weight of the water in the synthesis mixture as follows:

$$\text{solids-content} = \frac{\text{weight of the tetravalent and trivalent oxides in the synthesis mixture}}{\text{weight of the H}_2\text{O in the synthesis mixture}} \times 100\%$$

The M41S Family Mesoporous Molecular Sieve

The composition of matter by the process of this disclosure is a M41S family mesoporous molecular sieve.

One embodiment of the M41S family mesoporous molecular sieve made by the process of this disclosure comprising a crystalline phase material. The crystalline phase material has a composition expressed as follows:

$$M_{n/q}(T_aX_bY_cZ_dO_h)$$

where M is one or more ions, such as ammonium, Group 1, 2 and 17 ions, preferably hydrogen, sodium and/or fluoride ions; n is the charge of the composition excluding M expressed as oxides; q is the weighted molar average valence of M; n/q is the number of moles or mole fraction of M; T is one or more divalent elements, such as a divalent first row transition metal, e.g. manganese, cobalt, iron, and/or magnesium; X is one or more trivalent elements, such as aluminum, boron, iron and/or gallium, with aluminum preferred; Y is one or more tetravalent elements such as silicon and/or germanium, with silicon preferred; Z is one or more pentavalent elements, such as phosphorus; O is oxygen; a, b, c, and d are mole fractions of T, X, Y and Z, respectively; h is a number of from 1 to 2.5; and (a+b+c+d)=1.

A preferred embodiment of the above M41S family mesoporous molecular sieve is when (a+b+c) is greater than d, and h=2. A further embodiment is when a=0, d=0, and h=2, which may include an aluminosilicate.

The preferred aluminosilicates M41S family mesoporous molecular sieve has a silica-to-alumina molar ratio of about 5:1 to about 1000:1. Preferably, the composition of matter of this disclosure is an aluminosilicate characterized as having an alumina weight percent ($Al_2O_3$ wt. %) of about 0.1 to about 20 $Al_2O_3$ wt. %, based on the total weight of the composition of matter on dried base (dried in air at 120° C. for 24 hours) without counting organic template(s) or surfactant(s). Within this range, an alumina weight percent of less than or equal to about 15 can be employed, with less than or equal to about 10 $Al_2O_3$ wt. % more preferred. Also preferred within this range is weight percent of greater than or equal to about 1, with greater than or equal to about 4 $Al_2O_3$ wt. % more preferred. In a preferred embodiment, a and d are 0, h=2, X comprises aluminum, and Y comprises silicon.

Prior to calcination, (in the as-synthesized form), the M41S family mesoporous molecular sieve of this disclosure preferably has a composition, on an anhydrous basis, expressed empirically as follows:

$$rRM_{n/q}(T_aX_bY_cZ_dO_h);$$

wherein R is the total organic material not included in M as an ion, r is the coefficient for R, i.e. the number of moles or mole fraction of R, where T, X, Y, Z, O, n, q, a, b, c, d, and h are as defined above. The M and R components are associated with the material as a result of their presence during crystallization, and are easily removed or, in the case of M, replaced by post-crystallization methods hereinafter more particularly described. To the extent desired, the original M cations, e.g. sodium or potassium ions of the as-synthesized material can be replaced at least in part, by ion exchange with other ions. Preferred replacing ions include metal ions, hydrogen ions, hydrogen precursors including ammonium ions, and mixtures of ions.

Preferably, the M41S family mesoporous molecular sieve of this disclosure is crystalline in that it provides a diffraction pattern with at least one peak by X-ray, electron or neutron diffraction, following calcination. The composition of matter of this disclosure preferably yields an X-ray diffraction pattern with a few distinct maxima in the extreme low angle region. Preferably, the positions of these peaks approximately fit the positions of the hk0 reflections from a hexagonal lattice. The X-ray diffraction pattern, however, may not always be a sufficient indicator of the presence of these materials, as the degree of regularity in the microstructure and the extent of repetition of the structure within individual particles affect the number of peaks that will be observed. Indeed, preparations with only one distinct peak in the low angle region of the X-ray diffraction pattern have been found to comprise the present composition of matter.

In its calcined form, the M41S family mesoporous molecular sieve is a non-layered inorganic porous crystalline phase material which may be characterized by an X-ray diffraction pattern with at least one peak at a position greater than about 18 Angstrom Units (Å) d-spacing (4.909 degrees two-theta for Cu Kα radiation). More particularly, the calcined crystalline material of the disclosure may be characterized by an X-ray diffraction pattern with at least two peaks at positions greater than about 10 Å d-spacing (8.842 degrees two-theta for Cu Kα radiation), at least one of which is at a position greater than about 18 Å d-spacing, and no peaks at positions less than about 10 Å d-spacing with relative intensity greater than about 20% of the strongest peak. Still more particularly, the X-ray diffraction pattern of the calcined composition of matter of this disclosure will have no peaks at positions less than about 10 Å d-spacing with relative intensity greater than about 10% of the strongest peak.

The calcined non-layered inorganic porous crystalline phase material may be characterized as having a pore size greater than or equal to about 13 Å as measured by physiosorption measurements more particularly set forth herein.

The M41S family mesoporous molecular sieve of this disclosure may also be characterized based on sorption characteristics. Preferably, the M41S family mesoporous molecular sieve has an equilibrium benzene adsorption capacity of greater than about 15 grams benzene/100 grams M41S molecular sieve at 6.67 kPa-a (50 torr) and 25° C., based on anhydrous crystal material having been treated to insure no pore blockage by incidental contaminants is present. Accordingly, the sorption tests are conducted on the M41S family mesoporous molecular sieve having any pore blockage contaminants and water removed. Water may be removed by dehydration techniques, e.g. thermal treatment. Pore blocking inorganic amorphous materials, e.g. silica, and organics may be removed by contact with acid or base or other chemical agents such that these pore blocking inorganic amorphous materials will be removed without detrimental effect on the non-layered inorganic porous crystalline phase material.

Preferably, the equilibrium benzene adsorption capacity is determined by contacting the anhydrous material of the disclosure, after oxidative calcination at 450° C.-700° C. for at least one hour, and other treatment, if necessary, to remove any pore blocking contaminants, at 25° C. and 6.67 kPa-a (50 torr) benzene until equilibrium is reached. The weight of benzene sorbed (i.e., adsorbed) is then determined.

The equilibrium benzene adsorption capacity at 6.67 kPa-a (50 torr) and 25° C., based on anhydrous crystal material having been treated to insure no pore blockage by incidental contaminants is present, is preferably greater than or equal to about 20 grams benzene/100 grams M41S molecular sieve, more preferably greater than or equal to about 25 grams benzene/100 grams M41S molecular sieve.

The equilibrium cyclohexane adsorption capacity at 6.67 kPa-a (50 torr) and 25° C., based on anhydrous crystal material having been treated to insure no pore blockage by incidental contaminants is present is preferably greater than or equal to about 15 grams cyclohexane/100 grams M41S molecular sieve, more preferably greater than or equal to about 20 grams cyclohexane/100 grams M41S molecular sieve, still more preferably greater than or equal to about 25 grams cyclohexane/100 grams M41S molecular sieve.

The non-layered inorganic porous crystalline phase material may be synthesized with Brönsted acid active sites by incorporating a tetrahedrally coordinated trivalent element, such as Al, Ga, B, or Fe, within the tetrahedrally framework. Aluminosilicate materials of this type may be thermally and chemically stable, which are properties favored for acid catalysis. In addition, the mesoporous structures of the composition of matter may be utilized by employing highly siliceous materials or crystalline metallosilicate having one or more tetrahedral species having varying degrees of acidity. In addition to aluminosilicates, gallosilicate, ferrosilicate and borosilicate materials may also be employed.

The M41S family mesoporous molecular sieve may also be characterized using techniques that illustrate the microstructure of this material, including transmission electron microscopy and electron diffraction. In determining X-ray diffraction patterns, the X-ray diffraction data is preferably collected using an X-ray diffraction system employing theta-theta geometry, Cu Kα radiation, and an energy dispersive X-ray detector such that use of an energy dispersive X-ray detector eliminates the need for incident or diffracted beam monochromators. Both the incident and diffracted X-ray beams are also preferably collimated by double slit incident and diffracted collimation systems. Preferred slit sizes used, starting from the X-ray tube source, include 0.5, 1.0, 0.3 and 0.2 mm, respectively. However, different slit systems may produce differing intensities for the peaks in the X-ray diffraction patterns.

Diffraction data may be recorded using step-scanning at 0.04 degrees of two-theta, where theta is the Bragg angle, and a counting time of 10 seconds for each step is used. The interplanar spacings, d's, may be calculated in Angstrom units (Å), and the relative intensities of the lines, $I/I_o$, where $I_o$ is one-hundredth of the intensity of the strongest line, above background, are preferably derived with the use of a profile fitting routine. Furthermore, the intensities are preferably uncorrected for Lorentz and polarization effects. It should be understood that diffraction data which appears as a single line may consist of multiple overlapping lines which under certain conditions, such as very high experimental resolution or crystallographic changes, may appear as resolved or partially resolved lines. Accordingly, crystallographic changes can include minor changes in unit cell parameters and/or a change in crystal symmetry, without a substantial change in structure. These minor effects, including changes in relative intensities, can also occur as a result of differences in cation content, framework composition, nature and degree of pore filling, thermal and/or hydrothermal history, peak width/shape variations due to particle size/shape effects, structural disorder, and/or other factors known to those skilled in the art of X-ray diffraction.

Properly oriented specimens of the material preferably show a hexagonal arrangement of large channels and the corresponding electron diffraction pattern gives an approximately hexagonal arrangement of diffraction maxima. As used herein, the $d_{100}$ spacing of the electron diffraction patterns is the distance between adjacent spots on the hkO projection of the hexagonal lattice and is related to the repeat distance $a_0$ between channels observed in the electron micrographs through the formula $d_{100}=a_0(3/2)^{1/2}$. Accordingly, this $d_{100}$ spacing observed in the electron diffraction patterns corresponds to the d-spacing of a low angle peak in the X-ray diffraction pattern of the material. A preparation of the material may include greater than or equal to 20 to about 40 distinct spots observable in an electron diffraction pattern. These patterns can be indexed with the hexagonal hkO subset of unique reflections of 100, 110, 200, 210, and the like, and their symmetry-related reflections.

The $d_{100}$ may be directly calculated (i.e., determined) from the measured XRD spectrum, and/or may also be calculated based on one or more peaks in the XRD spectrum. For example, the value of the $d_{100}$ line may be calculated from the $d_{200}$ line based on the formula:

$$d_{100}=2(d_{200})=2(a_0(3/2)^{1/2}).$$

Accordingly, a calculated $d_{100}$ value may be used in the event that the $d_{100}$ value is not directly discernable from the XRD spectrum. As such, the preferred composition of matter has a base configuration consistent in many respects with the compound referred to as MCM-41, a detailed description of which can be found in U.S. Pat. No. 5,098,684.

The M41S family mesoporous molecular sieve may also comprise structural features and attributes of a group of mesoporous crystalline materials as described in U.S. Pat. Nos. 5,198,203 and 5,211,934, to which reference is made for a detailed description of these materials, their preparation and properties. These materials may be distinguished by the characteristic X-ray diffraction pattern of the calcined material. Using $d_1$ to indicate the d-spacings of the strongest peak in the X-ray diffraction pattern (relative intensity=100), the X-ray diffraction pattern of the calcined material exhibits $d_1$ at a position greater than about 18 Å d-spacing and at least one additional weaker peak with d-spacing $d_2$ such that the ratios of these d-spacings relative to $d_1$ (i.e., $d_n/d_1$) correspond to the following ranges:

| d-Spacing $d_n$, Å | $d_n/d_1$ | Relative Intensity |
|---|---|---|
| $d_1 \geq$ about 18 | 1.0 | 100 |
| $d_2$ | 0.87 ± 0.06 | w-m |

More preferably, the X-ray diffraction pattern of the calcined material includes at least two additional weaker peaks at d-spacings $d_2$ and $d_3$ such that the ratios of these d-spacings relative to the strongest peak $d_1$ at a position greater than about 18 Å d-spacing) correspond to the following ranges:

| d-Spacing $d_n$, Å | $d_n/d_1$ | Relative Intensity |
|---|---|---|
| $d_1 \geq$ about 18 | 1.0 | 100 |
| $d_2$ | 0.87 ± 0.06 | w-m |
| $d_3$ | 0.52 ± 0.04 | w |

Still more preferably, the X-ray diffraction pattern of the calcined materials includes at least four additional weaker peaks at d-spacings $d_2$, $d_3$, $d_4$ and $d_5$ such that the ratios of these d-spacings relative to the strongest peak $d_1$ (at a position greater than about 18 Å d-spacing) correspond to the following ranges:

| d-Spacing $d_n$, Å | $d_n/d_1$ | Relative Intensity |
|---|---|---|
| $d_1 \geq$ about 18 | 1.0 | 100 |
| $d_2$ | 0.87 ± 0.06 | w-m |
| $d_3$ | 0.55 ± 0.02 | w |
| $d_4$ | 0.52 ± 0.01 | w |
| $d_5$ | 0.50 ± 0.01 | w |

Calcined materials of this group preferably exhibit an X-ray diffraction pattern including at least two peaks at positions corresponding to the following ranges:

| d-Spacing $d_n$, Å | Relative Intensity |
|---|---|
| 33.0 ± 2.0 | 100 |
| 28.7 ± 1.5 | w |

More preferably, the X-ray diffraction patterns of the calcined examples presented herein can be characterized as including at least three peaks at positions corresponding to the following ranges:

| d-Spacing $d_n$, Å | Relative Intensity |
|---|---|
| 33.0 ± 2.0 | 100 |
| 28.7 ± 1.5 | w |
| 17.2 ± 1.2 | w |

Still more preferably, the X-ray diffraction patterns can be characterized as including at least five peaks at positions corresponding to the following ranges

| d-Spacing $d_n$, Å | Relative Intensity |
|---|---|
| 33.0 ± 2.0 | 100 |
| 28.7 ± 1.5 | w |
| 18.2 ± 0.5 | w |
| 17.2 ± 0.4 | w |
| 16.5 ± 0.3 | w |

The honeycomb microstructure of the non-layered inorganic porous crystalline phase material may also include several moieties interconnected in a three dimensional matrix or lattice having large hexagonal channels forming the ultra large pores of the catalyst. The repeating units forming the large ring structure of the lattice vary with pore size. In addition, a composition of matter may comprise 5 to 95 wt. % silica, clay and/or an alumina binder.

Furthermore, the M41S family mesoporous molecular sieve, preferably calcined, of the present disclosure preferably has a pore wall thickness of less than or equal to about 25 Å. Within this range, a pore wall thickness of less than or equal to about 20 Å can be employed, with less than or equal to about 15 Å more preferred. Also preferred within this range is a pore wall thickness of greater than or equal to about 1 Å, with greater than or equal to about 4 Å more preferred and greater than or equal to about 6 Å especially preferred. In a preferred embodiment the pore wall thickness is from about 1 to 25 Å, preferably, 2 to 25 Å, more preferably 3 to 25 Å, more preferably 4 to 23 Å, more preferably 5 to 20 Å, more preferably 5 to 18 Å, more preferably 6 to 15 Å.

The calcined M41S family mesoporous molecular sieve preferably has a substantially uniformity of pore size, wherein greater than or equal to about 80% of the pores have a pore diameter plus or minus about 20% the average pore diameter of the composition of matter; more preferably, greater than or equal to about 90% of the pores present have a pore diameter plus or minus about 5% the average pore diameter of the composition of matter.

The Method of Synthesizing the M41S Family Mesoporous Molecular Sieve

The M41S family mesoporous molecular sieve of this disclosure can be prepared or synthesized by one of several methods. One preferred method may include a reaction mixture having an $X_2O_3/YO_2$ mole ratio of from 0 to about 0.5, a crystallization temperature of from about 25° C. to about 250° C., preferably from about 50° C. to about 175° C., and an organic directing agent, or preferably a combination of an organic directing agent with an additional organic directing agent. This preferred method comprises preparing a reaction mixture containing sources of, for example, alkali or alkaline earth metal (M), e.g. sodium or potassium cation, one or a combination of oxides comprising: a divalent element T, e.g. cobalt; a trivalent element X, e.g. aluminum; a tetravalent element Y, e.g. silicon; a pentavalent element Z, e.g. phosphorus; an organic (R) directing agent or agents; and a solvent or solvent mixture comprising at least one of $C_1$-$C_6$ alcohol, $C_1$-$C_6$ diol, and water. The reaction mixture preferably has a composition, in terms of mole ratios of oxides, within the following ranges:

| Reactants | Preferred Range Greater than or equal to about ____ to about ____ (Mole ratio of oxides) | More Preferred Range Greater than or equal to about ____ to about ____ (Mole ratio of oxides) |
|---|---|---|
| $X_2O_3/YO_2$ | 0 to 0.05 | 0.001 to 0.05 |
| $X_2O_3/(YO_2 + Z_2O_5)$ | 0.1 to 100 | 0.1 to 20 |
| $X_2O_3/(YO_2 + TO + Z_2O_5)$ | 0.1 to 100 | 0.1 to 20 |
| Solvent/$YO_2$ | 2 to 10 | 4 to 8 |
| $OH^-/YO_2$ | 0 to 10 | 0.05 to 5 |
| $M_{2/e}O/(YO_2 + TO + Z_2O_5 + X_2O_3)$ | 0 to 10 | 0.05 to 5 |
| $R_{2/f}O/(YO_2 + TO + Z_2O_5 + X_2O_3)$ | 0.01 to 2.0 | 0.005 to 1 | wherein e and f are the weighted average valences of M and R, respectively.

In a preferred embodiment X is aluminum and Y is silicon in the above table.

When no Z and/or T oxides are added to the reaction mixture, the pH is preferably maintained at from about 10 to about 14. When Z and/or T oxides are present in the reaction mixture, the pH may vary between about 1 and 14 for crystallization of the M41S family mesoporous molecular sieve.

In other embodiments of this disclosure where X comprises aluminum and Y comprises silicon, the synthesis of the M41S family mesoporous molecular sieve of this disclosure has the crystallization temperature preferably from about 25° C. to about 175° C., preferably from about 50° C. to about 150° C., and an organic directing agent, preferably a combination of an organic directing agent plus an additional organic agent is used. This method comprises preparing a reaction mixture containing sources of, for example, alkali or alkaline earth metal (M), e.g., sodium or potassium cation if desired, one or more sources of aluminum and/or silicon, an organic (R) directing agent, and a solvent or solvent mixture, wherein the solvent or solvent mixture comprises at least one of $C_1$-$C_6$ alcohol, $C_1$-$C_6$ diol, and water. The reaction mixture has a composition, in terms of mole ratios of oxides, within the following ranges:

| Reactants | Preferred Range Greater than or equal to about ____ to about ____ (Mole ratio of oxides) | More Preferred Range Greater than or equal to about ____ to about ____ (Mole ratio of oxides) |
|---|---|---|
| $Al_2O_3/SiO_2$ | 0 to 0.5 | 0.001 to 0.05 |
| Solvent/$SiO_2$ | 2 to 10 | 4 to 8 |
| $OH^-/SiO_2$ | 0 to 10 | 0.05 to 5 |
| $M_{2/e}O/(SiO_2 + Al_2O_3)$ | 0 to 5 | 0.005 to 3 |
| $R_{2/f}O/(SiO_2 + Al_2O_3)$ | 0.01 to 2.0 | 0.03 to 1.0 | where e and f are the weighted average valences of M and R, respectively. The pH is preferably maintained at from about 9 to about 14.

Non-limiting examples of various combinations of T, X, Y, and Z contemplated for the non-layered inorganic porous crystalline phase materials are disclosed in the following table.

| Component T | Component X | Component Y | Component Z |
|---|---|---|---|
| — | Al | Si | — |
| — | Al | — | P |

-continued

| Component T | Component X | Component Y | Component Z |
|---|---|---|---|
| — | — | Si | P |
| Co | Al | — | P |
| Co | Al | Si | P |
| — | — | Si | — |

The compositions may also include the combinations of T comprising Mg or an element selected from the divalent first row transition metals including Mn, Co and Fe; X comprising B, Ga or Fe; and Y comprising Ge.

The preferred organic directing agent for use in synthesizing the M41S family mesoporous molecular sieve from the reaction mixture is a quaternary ammonium or phosphonium ion of the formula:

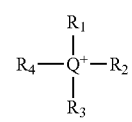

wherein Q is nitrogen or phosphorus and wherein at least one of $R_1$, $R_2$, $R_3$, and/or $R_4$ is aryl or alkyl having from 6 to about 36 carbon atoms, preferably wherein at least one of $R_1$, $R_2$, $R_3$, and/or $R_4$ comprises —$C_6H_{13}$, —$C_{10}H_{21}$, —$C_{16}H_{33}$, —$C_{18}H_{37}$, or combinations comprising at least one of the foregoing. The remainder of $R_1$, $R_2$, $R_3$, and/or $R_4$ preferably comprises hydrogen, alkyl of from 1 to 5 carbon atoms, and combinations comprising at least one of the foregoing. Preferably, the quaternary ammonium or phosphonium ion is derived from the corresponding hydroxide, halide, or silicate.

An additional organic may also be present in the reaction mixture along with the above quaternary ammonium or phosphonium. In one embodiment, an additional organic may be the quaternary ammonium or phosphonium ion of the above directing agent formula wherein $R_1$, $R_2$, $R_3$, and $R_4$ are each independently selected from hydrogen and alkyl of 1 to 5 carbon atoms.

Preferred directing agents include cetyltrimethylammonium, cetyltrimethylphosphonium, octadecyltrimethylammonium, octadecyltrimethylphosphonium, benzyltrimethylammonium, cetylpyridinium, decyltrimethylammonium, dimethyldidodecylammonium, and combinations comprising at least one of the foregoing.

The M41S family mesoporous molecular sieve of this disclosure may also be produced using a swelling agent, which may include being pillared to provide materials having a large degree of porosity. Examples of swelling agents include clays that may be swollen with water, whereby the layers of the clay are spaced apart by water molecules. Other materials include those which may be swollen with organic swelling agents as described in U.S. Pat. No. 5,057,296, and the like. Organic swelling agents may include amines, quaternary ammonium compounds, alkyl and aromatic swelling agents. Preferred swelling agents include alkyl-substituted aromatics such as 1,3,5-trimethylbenzene, and the like. Examples of non-water swellable layered materials are described in U.S. Pat. No. 4,859,648 and include silicates, magadiite, kenyaite, trititanates and perovskites. Other examples of a non-water swellable layered materials which can be swollen with organic swelling agents include vacancy-containing titanometallate material, as described in U.S. Pat. No. 4,831,006.

Once a material is swollen, the material may be pillared by interposing a thermally stable substance, such as silica, between the spaced apart layers. The aforementioned U.S. Pat. Nos. 4,831,006 and 4,859,648 describe methods for pillaring non-water swellable layered materials described therein, and are incorporated herein by reference for definition of pillaring and pillared materials.

Other patents teaching pillaring of materials and the pillared products include U.S. Pat. Nos. 4,216,188; 4,248,739; 4,176,090; and 4,367,163; and European Patent Application 205,711.

The X-ray diffraction patterns of pillared materials can vary considerably, depending on the degree that swelling and pillaring disrupt the otherwise usually well-ordered microstructure. The regularity of the microstructure in some pillared materials is so badly disrupted that only one peak in the low angle region on the X-ray diffraction pattern is observed, as a d-spacing corresponding to the repeat distance in the pillared material. Less disrupted materials may show several peaks in this region that are generally orders of this fundamental repeat. X-ray reflections from the crystalline structure of the layers are also sometimes observed. The pore size distribution in pillared materials may be narrower than those in amorphous and paracrystalline materials, but may be broader than that in crystalline framework materials.

In producing the M41S family mesoporous molecular sieve of this disclosure, the reaction mixture components may be supplied by more than one source and the reaction mixture may be prepared either batch wise or continuously. Furthermore, the non-layered inorganic porous crystalline phase composition of matter can be shaped into a wide variety of particle sizes and include a powder, a granule, or a molded product, such as an extrudate. In cases where the catalyst is molded, such as by extrusion, the crystals can be extruded before drying or partially dried and then extruded.

In the above improved procedure, batch crystallization can be carried out under either static or agitated, e.g. stirred, conditions in a suitable reactor vessel, such as for example, polypropylene jars or teflon lined or stainless steel autoclaves. Crystallization may also be conducted continuously in suitable equipment. The total useful range of temperatures for crystallization is from about to, preferably from about to about for a time sufficient for crystallization to occur at the temperature used, e.g. from about 5 minutes to about 14 days. Thereafter, the crystals are separated from the mother liquid and recovered without a purification step, for example, a filtration and/or washing step. After crystallization, the resulting product may be in a paste form or in a high viscosity slurry form. The product of the crystallization is recovered without purification steps, such as, for example, filtration and/or washing steps.

The method for synthesizing M41S materials of this disclosure comprises the steps of:

(1) Mixing an organic (R) directing agent with the solvent or solvent mixture such that the mole ratio of solvent/$R_{2/f}O$ is within the range of from about 0.5 to about 3000, preferably from about 2 to 10. This mixture constitutes the "primary template" for the synthesis method.

(2) To the primary template mixture of step (1), adding the sources of oxides, e.g. silica and/or alumina such that the ratio of $R_{2/f}O/(YO_2+X_2O_3)$ is within the range of from about 0.01 to about 2.0.

(3) Agitating the mixture resulting from step (2) at a temperature of from about 20° C. to about 100° C., preferably from about 25 to 40° C., for about 5 minutes to about 3 hours.

(4) Allowing the mixture to stand with or without agitation, preferably at a temperature of from about 20° C. to about 100° C. and preferably for about 5 minutes to about 24 hours.

(5) Crystallizing the product from step (4) at a temperature in the range of about 25° C. to 250° C., preferably from about 50° C. to about 175° C., preferably for about 1 hour to about 72 hours. Crystallization temperatures higher in the given ranges are more preferred.

(6) Thereafter, separating and/or recovering the crystals from the mother liquor without a purification step, for example, a filtration and/or washing step.

In another embodiment, the method of synthesizing the M41S family mesoporous molecular sieve involves the reaction mixture comprising tetraethylorthosilicate as the source of silicon oxide with the following steps:

(1) Mixing the organic (R) directing agent with the solvent or solvent mixture such that the mole ratio of solvent/$R_{2/f}O$ is within the range of from about 0.5 to about 3000, preferably from about 1 to 30. This mixture constitutes the "primary template" for the synthesis method.

(2) Mixing the primary template mixture of step (1) with tetraethylorthosilicate and a source of trivalent oxide, e.g., aluminum oxide, if desired, such that the $R_{2/f}O/SiO_2$ mole ratio is in the range of from about 0.5 to about 2.0.

(3) Agitating the mixture resulting from step (2) for about 10 minutes to about 6 hours, preferably about 30 minutes to about 2 hours, at a temperature of about 0° C. to about 25° C., and a pH of less than 12. This step permits hydrolysis/polymerization to take place and the resultant mixture may appear cloudy.

(4) Crystallizing the product from step (3) at a temperature of about 25° C. to about 250° C., preferably about 80° C. to about 150° C., for about 4 to about 72 hours, preferably about 16 to about 48 hours. Crystallization of the composition of matter can be carried out under either static or agitated, e.g. stirred, conditions in a suitable reactor vessel, such as for example, polypropylene jars or Teflon lined or stainless steel autoclaves. The range of temperatures for crystallization is preferably about 50° C. to about 250° C. for a time sufficient for crystallization to occur at the temperature used. Preferred crystallization time's range from about 5 minutes to about 14 days.

(5) Thereafter, separating or recovering the crystals from the mother liquor without a purification step, for example, a filtration and/or washing step.

One or more embodiments of the synthesis method further comprises the step of mixing at least a portion of the composition of matter with another material, either before or after recovering and/or separating steps, wherein the amount of the material to be mixed with the composition of matter is such that the composition of matter having less than 10 wt. % free fluid, preferably less than 5 wt. % free fluid, more preferably less than 1 wt. % free fluid. The material may be any suitable compound capable of to produce a composition of matter having less than 10 wt. % free fluid.

Not intended to be limited by any theory, it is believed that the mother liquor of the product often containing certain amount of tetravalent element, which may block the channels of the molecular sieve during the calcination. By mixing the product of the crystallization process with a material to form a composition such that the composition having less than 10 wt. % free fluid, the majority of the tetravalent element is transferred to the material which prevents the blockage of channels during the calcination/drying step.

The material may be any suitable compound capable of to produce a composition of matter having less than 10 wt. % free fluid. In some embodiments, the material comprises at least one of oxide of an element selected from group 1 to group 17 of the periodic table and mixtures thereof. In a preferred embodiment, the material comprises at least one of silica, alumina, titania, zirconia and mixtures thereof.

In still other embodiments, the material is selected from the group consisting of metal oxides, metal nitrides, metal carbides and mixtures thereof.

The material useful for adsorbing mother liquor also includes synthetic or naturally occurring zeolites as well as inorganic materials such as clays, silica and/or metal oxides such as alumina. The latter may be either naturally occurring or in the form of gelatinous precipitates or gels including mixtures of silica and metal oxides. These materials, i.e., clays, oxides, etc., may also function as binders for the catalyst to provide a catalyst having good crush strength.

Synthetic and naturally occurring clays which are useful include the montmorillonite, bentonite and kaolin family, which families include the subbentonites, and the kaolins commonly known as Dixie, McNamee, Georgia and Florida clays or others in which the main mineral constituent is halloysite, kaolinite, dictite, narcite, or anauxite. Such clays can be used in the raw state as originally mined or initially subjected to calcination, acid treatment or chemical modification.

Other useful materials for absorbing mother liquor include one or more a porous matrix material such as silica-alumina, silica-magnesia, silica-zirconia, silica-thoria, silica-beryllia, silica-titania as well as ternary compositions such as silica-alumina-thoria, silica-alumina-zirconia silica-alumina-magnesia and silica-magnesia-zirconia. Other absorptive materials, include, but are not limited to carbon, either alone or combined with other absorptive materials.

The relative proportions of finely divided crystalline material and inorganic oxide matrix vary widely, with the crystal content in the range of from about 1 to about 90 percent by weight and more usually, particularly when the composite is prepared in the form of beads, in the range of about 2 to about 80 wt. % of the composite.

In some embodiments of this disclosure, the solids-content of a synthesis mixture useful for this disclosure is in the range of from 20 wt. % to 50 wt. %. In other embodiments, the solids-content of a synthesis mixture useful for this disclosure is in the range of from 25 wt. % to 35 wt. %. In yet other embodiments, the solids-content of a synthesis mixture useful for this disclosure is in the range of from 25 wt. % to 30 wt. %. The following solids-contents are useful lower solids-content limits: 20, 21, 22, 23, 24, 25, 30, 35, 40, 45, and 49. The following solids-contents are useful upper solids-content limits: 50, 45, 40, 35, 30, 29, 28, 27, 26 and 25. The solids-content of a synthesis mixture useful for this disclosure ideally falls in a range between any one of the above-mentioned lower limits and any one of the above-mentioned upper limits, so long as the lower limit is less than or equal to the upper limit.

In still yet other embodiments, the solids-content of a synthesis mixture is at least 15 wt. %, preferably at least 18 wt. %, more preferably at least 20 wt. %, even more preferably at least 25 wt. %, and most preferably at least 30 wt. %. The solids-content useful in this invention includes a range from at least about 15 wt. %, preferably at least about 18 wt. %, more preferably at least about 20 wt. %, even more preferably at least about 25 wt. %, and most preferably at least about 30 wt. % to less than 50 wt. %, preferably less than about 45 wt. %, more preferably less than about 40 wt. %, and most preferably less than about 35 wt. %.

In one or more numbered embodiments, the invention relates to:

1. A method for synthesizing a composition of matter comprising an inorganic, porous crystalline phase material having, after calcination, a hexagonal arrangement of uniformly-sized pores having diameters of at least about 13 Angstrom Units and exhibiting a hexagonal electron diffraction pattern that can be indexed with a $d_{100}$ value greater than about 18 Angstrom Units, which comprises:
   (a) preparing a mixture capable of forming said composition, said mixture comprising sources of one or a combination of oxides selected from the group consisting of divalent element W, trivalent element X, tetravalent element Y and pentavalent element Z, an organic (R) directing agent and solvent or solvent mixture, and having a composition, in terms of mole ratios, within the following ranges:

| | |
|---|---|
| $X_2O_3/YO_2$ | 0 to 0.5 |
| $X_2O_3/(YO_2 + Z_2O_5)$ | 0 to 100 |
| $X_2O_3/(YO_2 + WO + Z_2O_5)$ | 0 to 100 |
| Solvent/$(YO_2 + WO + Z_2O_5 + X_2O_3)$ | 2 to 10 |
| $OH^-/YO_2$ | 0 to 10 |
| $M_{2/e}O/(YO_2 + WO + Z_2O_5 + X_2O_3)$ | 0 to 10 |
| $R_{2/f}O/(YO_2 + WO + Z_2O_5 + X_2O_3)$ | 0.01 to 2.0 | wherein e and f are the weighted average valences of M and R, respectively, M is an alkali or alkaline earth metal ion and R comprises an ion of the formula $R_1R_2R_3R_4Q^+$, wherein Q is nitrogen or phosphorus and wherein at least one of $R_1$, $R_2$, $R_3$ and $R_4$ is selected from the group consisting of aryl of from 6 to about 36 carbon atoms, alkyl of from 6 to about 36 carbon atoms and combinations thereof, the remainder of $R_1$, $R_2$, $R_3$ and $R_4$ being selected from the group consisting of hydrogen, alkyl of from 1 to 5 carbon atoms and combinations thereof;
(b) maintaining said mixture under sufficient conditions of pH, temperature and time to form a product comprising said composition of matter; and
(c) recovering said composition of matter from said product without a purification step.
2. The method of embodiment 1, wherein said mixture has a solids-content in the range of about 20 to about 50 wt. % or about 25 to about 35 wt. %.
3. The method of embodiment 1, further comprising the step of:
(d) mixing at least a portion of said product with a material to form said composition of matter, wherein the amount of said material to be mixed with said product is such that said composition having less than 10 wt. % free fluid.
4. The method of embodiment 3, wherein said material is selected from the group consisting of metal oxides, metal nitrides, metal carbides and mixtures thereof.
5. The method of embodiment 3, wherein said material is an absorptive material selected from the group consisting of carbon, silica-alumina, silica-magnesia, silica-zirconia, silica-thoria, silica-beryllia, silica-titania, silica-alumina-thoria, silica-alumina-zirconia silica-alumina-magnesia and silica-magnesia-zirconia and mixtures thereof
6. The method of any preceding embodiment, wherein said mixture comprises an additional organic directing agent ion R of the formula $R_1R_2R_3R_4Q^+$, wherein $R_1$, $R_2$, $R_3$ and $R_4$ are selected from the group consisting of hydrogen, alkyl of 1 to 5 carbon atoms and combinations thereof.
7. The method of any preceding embodiment, wherein R comprises an organic agent selected from the group consisting of cetyltrimethylammonium, octadecyltrimethylammonium, benzyltrimethylammonium, cetylpyridinium, myristyltrimethylammonium, decyltrimethylammonium, dodecyltrimethylammonium and dimethyldidodecylammonium.
8. The method of any preceding embodiment, wherein said $R_1$, $R_2$, $R_3$ and $R_4$ are selected from the group consisting of —$C_6H_{13}$, —$C_{10}H_{21}$, —$C_{12}H_{25}$, —$C_{14}H_{29}$, —$C_{16}H_{33}$, —$C_{18}H_{37}$ and combinations thereof
9. The method of any preceding embodiment, further comprising a step of adding to said reaction mixture is an auxiliary organic selected from the group consisting of (1) aromatic hydrocarbons and amines of from 5 to 20 carbons and halogen- and $C_1$-$C_{14}$ alkyl-substituted derivatives thereof, (2) cyclic aliphatic hydrocarbons and amines of from 5 to 20 carbons and halogen- and $C_1$-$C_{14}$ alkyl-substituted derivatives thereof, (3) polycyclic aliphatic hydrocarbons and amines of from 6 to 20 carbons and halogen- and $C_1$-$C_{14}$ alkyl-substituted derivatives thereof, (4) straight and branched aliphatic hydrocarbons and amines of from 3 to 16 carbons and halogen-substituted derivatives thereof, and (5) combinations thereof, and having a composition, in terms of mole ratios, within the following ranges:

| | |
|---|---|
| Auxiliary Organic/$YO_2$ | 0.05 to 20 |
| Auxiliary Organic/$R_{2/f}O$ | 0.02 to 100 |

10. The method of embodiment 9, wherein said auxiliary organic is selected from the group consisting of pentane, hexane, heptane, octane, nonane, decane, dodecane, dihalooctane, p-xylene, trimethylbenzene, triethylbenzene, dimethyladamantane, benzene, alkyl-substituted benzene, alkyl-substituted adamantane and combinations thereof, alkyl being of from 1 to about 14 carbon atoms.
11. The method of any preceding embodiment, wherein said Y is Silicon.
12. The method of any preceding embodiment, wherein said X is aluminum.
13. A method for making a composition of matter comprising an inorganic, porous crystalline phase material having, after calcination, a hexagonal arrangement of uniformly-sized pores having diameters of at least about 13 Angstrom Units and exhibiting a hexagonal electron diffraction pattern that can be indexed with a $d_{100}$ value greater than about 18 Angstrom Units, which comprises:
(a) preparing a reaction mixture capable of forming said composition, said reaction mixture comprising sources of an oxide of silicon or a combination of oxides selected from the group consisting of silicon and aluminum, an organic (R) directing agent and solvent or solvent mixture, and having a composition, in terms of mole ratios, within the following ranges:

| | |
|---|---|
| $Al_2O_3/SiO_2$ | 0 to 0.5 |
| Solvent/($SiO_2 + Al_2O_3$) | 2 to 10 |
| $OH^-/SiO_2$ | 0 to 10 |
| $M_{2/e}O/(SiO_2 + Al_2O_3)$ | 0 to 5 |
| $R_{2/f}O/(SiO_2 + Al_2O_3)$ | 0.01 to 2.0 | wherein e and f are the weighted average valences of M and R, respectively, M is an alkali or alkaline earth metal ion and R comprises an ion of the formula R $R_1R_2R_3R_4Q^+$, wherein Q is nitrogen or phosphorus and wherein at least one of $R_1$, $R_2$, $R_3$ and $R_4$ is selected from the group consisting of aryl of from 6 to about 36 carbon atoms, alkyl of from 6 to about 36 carbon atoms and combinations thereof, the remainder of $R_1$, $R_2$, $R_3$ and $R_4$ being selected from the group consisting of hydrogen, alkyl of from 1 to 5 carbon atoms and combinations thereof, said step (a) comprising (1) mixing the organic (R) directing agent with the solvent or solvent mixture such that the mole ratio of solvent/$R_{2/f}O$ is within the range of from about 50 to about 800, (2) adding to the mixture of step (a)(1) the sources of oxides, such that the ratio of $R_{2/f}O/(SiO_2+Al_2O_3)$ is within the range of from about 0.01 to about 2.0, (3) agitating the mixture resulting from step (a)(2) at a temperature of from about 20° C. to about 40° C. and optionally (4) aging the mixture resulting from step (a)(3) at a temperature of from about 20° C. to about 100° C. for from about 10 minutes to about 24 hours;
(b) maintaining said mixture under sufficient conditions of pH, temperature and time to form a product comprising said composition of matter; and
(c) recovering said composition of matter from said product without a purification step.
14. The method of embodiment 13, wherein said mixture of step (a) has a solids-content in the range of 20 to 50 wt. %.
15. The method of embodiment 13, wherein said mixture of step (a) has a solids-content in the range of 25 to 35 wt. %.
16. The method of any one of embodiments 13-15, wherein said mixture of step (a) comprises an additional organic directing agent ion R of the formula $R_1R_2R_3R_4Q^+$, wherein $R_1$, $R_2$, $R_3$ and $R_4$ are selected from the group consisting of hydrogen, alkyl of 1 to 5 carbon atoms and combinations thereof 17. The method of any one of embodiments 13-16, wherein R comprises an organic agent selected from the group consisting of cetyltrimethylammonium, octadecyltrimethylammonium, benzyltrimethylammonium, cetylpyridinium, myristyltrimethylammonium, decyltrimethylammonium, dodecyltrimethylammonium and dimethyldidodecylammonium.

18. The method of any one of embodiments 13-17, wherein said $R_1$, $R_2$, $R_3$ and $R_4$ are selected from the group consisting of —$C_6H_{13}$, —$C_{10}H_{21}$, —$C_{12}H_{25}$, —$C_{14}H_{29}$, —$C_{16}H_{33}$, —$C_{18}H_{37}$ and combinations thereof.

19. The method of any one of embodiments 13-18, further comprising a step of adding to said reaction mixture is an auxiliary organic selected from the group consisting of (1) aromatic hydrocarbons and amines of from 5 to 20 carbons and halogen- and $C_1$-$C_{14}$ alkyl-substituted derivatives thereof, (2) cyclic aliphatic hydrocarbons and amines of from 5 to 20 carbons and halogen- and $C_1$-$C_{14}$ alkyl-substituted derivatives thereof, (3) polycyclic aliphatic hydrocarbons and amines of from 6 to 20 carbons and halogen- and $C_1$-$C_{14}$ alkyl-substituted derivatives thereof, (4) straight and branched aliphatic hydrocarbons and amines of from 3 to 16 carbons and halogen-substituted derivatives thereof, and (5) combinations thereof, and having a composition, in terms of mole ratios, within the following ranges:

| | |
|---|---|
| Auxiliary Organic/$SiO_2$ | 0.05 to 20 |
| Auxiliary Organic/$R_{2/f}O$ | 0.02 to 100 |

20. The method of embodiment 19, wherein said auxiliary organic is selected from the group consisting of pentane, hexane, heptane, octane, nonane, decane, dodecane, dihalooctane, p-xylene, trimethylbenzene, triethylbenzene, dimethyladamantane, benzene, alkyl-substituted benzene, alkyl-substituted adamantane and combinations thereof, alkyl being of from 1 to about 14 carbon atoms.

21. A process of making a catalyst comprising:
   (a) extruding a mixture comprising a binder and said composition of matter made by any preceding claim to form an extrudate; and
   (b) calcining said extrudate under calcination conditions having a temperature in the range of 100 to 700° C.

22. The process of claim 21, further comprising a filtration or a washing step after step (b).

23. A composition of matter made by any preceding claim.

24. A process of using the composition of matter made by any one of claims 1-21 in a hydrocarbon conversion, said process comprises contacting a hydrocarbon with said composition of matter under conversion conditions effective to convert at least 1 wt. % of said hydrocarbon.

These and other facets of the present invention are exemplified by the following Examples.

EXAMPLES

In the Examples, the XRD diffraction patterns of the as-synthesized materials were recorded on a Bruker D4 X-Ray Powder Diffractometer using copper Kα radiation in the 2θ range of 2 to 40 degrees.

The SEM images were obtained on a HITACHI 54800 Field Emission Scanning Electron Microscope (SEM).

The BET surface area was measured by Micromeritics TriStar 3000 V6.05A (Micromeritics Corporation, Norcross, Ga.) with sample pretreated at 350° C. in air.

The following table lists chemical components used in the Examples for the synthesis of MCM-41 materials of this disclosure.

| Component | Brief Description | Source |
|---|---|---|
| Tetraethylammonium Hydroxide (TEAOH) 35 wt. % solution | Hydroxide source | Aldrich |
| ARQUAD 12/37 solution | Surfactant source | Akzo Nobel |
| Sodium aluminate 45 wt. % solution | Alumina source | US Aluminate |
| Ultrasil silica | Silica source | Degussa AG |

Example 1

A mixture was prepared from 300 g of TEAOH 35 wt. % solution, 500 g of ARQUAD 12/37 solution, and 350 g of Ultrasil silica. The mixture had a solids-content of 28 wt. % and the following molar composition:

| | |
|---|---|
| $SiO_2/Al_2O_3$ | ≥800/1 |
| $H_2O/SiO_2$ | ~5.6 |
| TEAOH/Surfactant | ~1 |
| $SiO_2$/Surfactant | ~7.7 |

The mixture was reacted at 290° F. (121° C.) in an autoclave without stirring for 24 hours. The product was discharged and dried at 120° C. before use. The XRD pattern of the as-synthesized material showed the typical pure phase of MCM-41 topology. The SEM of the as-synthesized material shows that the material was composed of agglomerates of small crystals. The resulting calcined Si-MCM-41 product had a $SiO_2/Al_2O_3$ molar ratio of 1270/1 and surface area of 883 m²/g.

Example 2

A mixture was prepared from 300 g of TEAOH 35 wt. % solution, 500 g of ARQUAD 12/37 solution, 41 g of sodium aluminate (45 wt. %) solution, and 350 g of Ultrasil silica. The mixture had a solids-content of 28 wt. % and the following molar composition:

| | |
|---|---|
| $SiO_2/Al_2O_3$ | ~50/1 |
| $H_2O/SiO_2$ | ~5.6 |
| TEAOH/Surfactant | ~1 |
| $SiO_2$/Surfactant | ~7.7 |

The mixture was reacted at 290° F. (121° C.) in an autoclave without stirring for 24 hours. The product was discharged and dried at 120° C. before use. The XRD pattern of the as-synthesized material showed the typical pure phase of MCM-41 topology. The SEM of the as-synthesized material shows that the material was composed of agglomerates of small crystals. The resulting calcined Al-MCM-41 product had a $SiO_2/Al_2O_3$ molar ratio of 48/1.

Example 3

A mixture was prepared from 300 g of TEAOH 35 wt. % solution, 500 g of ARQUAD 12/37 solution, and 350 g of Ultrasil silica. The mixture had a solids-content of 28 wt. % and the following molar composition:

| | |
|---|---|
| $SiO_2/Al_2O_3$ | ≥800/1 |
| $H_2O/SiO_2$ | ~5.6 |
| TEAOH/Surfactant | ~1 |
| $SiO_2$/Surfactant | ~7.7 |

The mixture was reacted at 122° C. in a 2-liter autoclave without stirring for 36 hours. The product was discharged and dried at 120° C. before use. The XRD pattern of the as-synthesized material showed the typical pure phase of MCM-41 topology. The SEM of the as-synthesized material shows that the material was composed of agglomerates of small crystals. Surface area of the resulting calcined Si-MCM-41 product is about 800 $m^2/g$.

Example 4

A mixture was prepared from 300 g of TEAOH 35 wt. % solution, 500 g of ARQUAD 12/37 solution, 41 g of sodium aluminate (45 wt. %) solution, and 350 g of Ultrasil silica. The mixture had a solids-content of 28 wt. % and the following molar composition:

| | |
|---|---|
| $SiO_2/Al_2O_3$ | ~50/1 |
| $H_2O/SiO_2$ | ~5.6 |
| TMAOH/Surfactant | ~1 |
| $SiO_2$/Surfactant | ~7.7 |

The mixture was reacted at 122° C. in a 2-liter autoclave without stirring for 36 hours. The product was discharged and dried at 120° C. before use. The XRD pattern of the as-synthesized material showed the typical pure phase of MCM-41 topology. The SEM of the as-synthesized material shows that the material was composed of agglomerates of small crystals. The resulting calcined Al-MCM-41 crystals had a $SiO_2/Al_2O_3$ molar ratio of 49.5/1 and surface area of 622 $m^2/g$.

Example 5

A MCM-41 self-bound catalyst was prepared from those as-synthesized crystals produced in Example 1. The as-synthesized product was dried in an oven at 120° C. for 5-10 minutes. Then, the resulting product was mulled and formed into 1.59 mm cylindrical extrudates. The prepared extrudates were dried at 120° C. before use. The dry extrudates were pre-calcined in $N_2$ at 482° C. for 3 hrs, then washed with warm water having a temperature of about 60° C. for 2 times and 2 hrs each time, followed by the final air-calcination at 540° C. for 4 hours. The final catalyst has a surface area of 751 $m^2/g$.

Example 6

A MCM-41/alumina catalyst was prepared from those as-synthesized crystals produced in Example 1. The as-synthesized product was dried in an oven at 120° C. for 5-10 minutes. Then, the resulting product and alumina were mulled and formed into 1.59 mm cylindrical extrudates. The prepared extrudates were dried at 120° C. before use. The dry extrudates were pre-calcined in $N_2$ at 482° C. for 3 hrs, then washed with warm water having a temperature of about 60° C. for 2 times and 2 hrs each time, followed by the final air-calcination at 540° C. for 4 hours. The final catalyst has a surface area of 610 $m^2/g$.

Example 7

A MCM-41/alumina catalyst was prepared from those as-synthesized crystals produced in Example 2. The as-synthesized product was mixed with alumina and water. Then, the mixture was mulled and formed into 1.59 mm cylindrical extrudates. The prepared extrudates were dried at 120° C. before use. The dry extrudates were pre-calcined in $N_2$ at 482° C. for 3 hrs, then washed with warm water having a temperature of about 60° C. for 2 times and 2 hrs each time, followed by the final air-calcination at 540° C. for 4 hours. The final catalyst has a surface area of 505 $m^2/g$.

Example 8

A MCM-41/alumina catalyst was prepared from those as-synthesized crystals produced in Example 3. The as-synthesized product was mixed with alumina and water. Then, the mixture was mulled and formed into 1.59 mm cylindrical extrudates. The prepared extrudates were dried at 120° C. before use. The dry extrudates were pre-calcined in $N_2$ at 482° C. for 3 hrs, then washed with warm water having a temperature of about 60° C. for 2 times and 2 hrs each time, followed by the final air-calcination at 540° C. for 4 hours. The final catalyst has a surface area of 560 $m^2/g$.

All patents, patent applications, test procedures, priority documents, articles, publications, manuals, and other documents cited herein are fully incorporated by reference to the extent such disclosure is not inconsistent with the present invention and for all jurisdictions in which such incorporation is permitted.

While the illustrative embodiments of this invention have been described with particularity, it will be understood that various other modifications will be apparent to and can be readily made by those skilled in the art without departing from the spirit and scope of this invention. Accordingly, it is not intended that the scope of the claims appended hereto be limited to the examples and descriptions set forth herein but rather that the claims be construed as encompassing all the features of patentable novelty which reside in the present invention, including all features which would be treated as equivalents thereof by those skilled in the art to which this invention pertains.

What is claimed is:

1. A method of making a M41S family composition of matter comprising an inorganic, porous crystalline phase material having, after calcination, a hexagonal arrangement of uniformly-sized pores having diameters of at least about 13 Angstrom Units and exhibiting a hexagonal electron diffraction pattern that can be indexed with a $d_{100}$ value greater than about 18 Angstrom Units, comprising the steps of:
    (a) crystallizing a mixture comprising sources of one oxide or a combination of oxides, an organic (R) directing agent, and solvent or solvent mixture, said oxides selected from the group consisting of divalent element W, trivalent element X, tetravalent element Y and pentavalent element Z, under conditions of pH, temperature and time to form a product comprising a M41S family molecular sieve and a mother liquid, wherein said mixture having a composition, in terms of mole ratios, within the following ranges:

| | |
|---|---|
| $X_2O_3/YO_2$ | 0.001 to 0.05 |
| $X_2O_3/(YO_2 + Z_2O_5)$ | 0.1 to 20 |
| $X_2O_3/(YO_2 + WO + Z_2O_5)$ | 0.1 to 20 |
| Solvent/$(YO_2 + WO + Z_2O_5 + X_2O_3)$ | 2 to 10 |
| $OH^-/YO_2$ | 0 to 10 |
| $M_{2/e}O/(YO_2 + WO + Z_2O_5 + X_2O_3)$ | 0 to 10 |
| $R_{2/f}O/(YO_2 + WO + Z_2O_5 + X_2O_3)$ | 0.01 to 2.0 | wherein e and f are the weighted average valences of M and R, respectively, M is an alkali or alkaline earth metal ion and R comprises an ion of the formula $R_1R_2R_3R_4Q^+$, wherein Q is nitrogen or phosphorus and wherein at least one of $R_1$, $R_2$, $R_3$ and $R_4$ is selected from the group consisting of aryl of from 6 to about 36 carbon atoms, alkyl of from 6 to about 36 carbon atoms and combinations thereof, the remainder of $R_1$, $R_2$, $R_3$ and $R_4$ being selected from the group consisting of hydrogen, alkyl of from 1 to 5 carbon atoms and combinations thereof;

(b) before steps of recovering and/or separating said M41S molecular sieve from the mother liquor, mixing at least a portion of said product comprising said M41S molecular sieve and said mother liquor as free fluid with a material to form said M41S composition of matter having less than 1 wt. % of said free fluid.

2. The method of claim 1, further comprising the steps of:
(c) extruding said M41S family composition of matter of step (b) to form an extrudate, and
(d) calcining said extrudate under calcination conditions at a temperature in the range of 100° C. to 700° C. to form said catalyst.

3. The method of claim 2, further comprising the step of drying said M41S composition of matter before extruding step (c).

4. The method of claim 1, wherein said material is selected from the group consisting of metal oxides, metal nitrides, metal carbides, and mixtures thereof.

5. The method of claim 1, wherein said material is an absorptive material selected from the group consisting of carbon, silica-alumina-thoria, silica-alumina-zirconia, silica-thoria, silica-beryllia, silica-titania, silica-alumina-thoria, silica-alumina-zirconia silica-alumina-magnesia and silica-magnesia-zirconia, and mixtures thereof.

6. The method of claim 1, wherein said material is an adsorptive material selected from the group consisting of clays, silica, alumina, and mixtures thereof.

7. The method of claim 1, wherein said mixture of step (a) comprises an additional organic directing agent ion R of the formula $R_1R_2R_3R_4Q^+$, wherein $R_1$, $R_2$, $R_3$ and $R_4$ are selected from the group consisting of hydrogen, alkyl of 1 to 5 carbon atoms and combinations thereof.

8. The method of claim 1, wherein R comprises an organic agent selected from the group consisting of cetyltrimethylammonium, octadecyltrimethylammonium, benzyltrimethylammonium, cetylpyridinium, myristyltrimethylammonium, decyltrimethylammonium, dodecyltrimethylammonium and dimethyldidodecylammonium.

9. The method of claim 1, wherein said $R_1$, $R_2$, $R_3$ and $R_4$ are selected from the group consisting of $-C_6H_{13}$, $-C_{10}H_{21}$, $-C_{12}H_{25}$, $-C_{14}H_{29}$, $-C_{16}H_{33}$, $-C_{18}H_{37}$, and combinations thereof.

10. The method of claim 1, further comprising a step of adding to said mixture of step (a) an auxiliary organic selected from the group consisting of: (1) aromatic hydrocarbons and amines of from 5 to 20 carbons and halogen- and $C_1$-$C_{14}$ alkyl-substituted derivatives thereof; (2) cyclic aliphatic hydrocarbons and amines of from 5 to 20 carbons and halogen- and $C_1$-$C_{14}$ alkyl-substituted derivatives thereof; (3) polycyclic aliphatic hydrocarbons and amines of from 6 to 20 carbons and halogen- and $C_1$-$C_{14}$ alkyl-substituted derivatives thereof; (4) straight and branched aliphatic hydrocarbons and amines of from 3 to 16 carbons and halogen-substituted derivatives thereof; and (5) combinations thereof, and having a composition, in terms of mole ratios, within the following ranges:

| | |
|---|---|
| Auxiliary Organic/$YO_2$ | 0.05 to 20 |
| Auxiliary Organic/$R_{2/f}O$ | 0.02 to 100 |

11. The method of claim 10, wherein said auxiliary organic is selected from the group consisting of: pentane, hexane, heptane, octane, nonane, decane, dodecane, dihalooctane, p-xylene, trimethylbenzene, triethylbenzene, dimethyladamantane, benzene, alkyl-substituted benzene, alkyl-substituted adamantane, and combinations thereof, alkyl being of from 1 to about 14 carbon atoms.

12. The method of claim 1, wherein said Y is silicon and wherein said X is aluminum.

13. A method of making a M41S family composition of matter comprising an inorganic, porous crystalline phase material having, after calcination, a hexagonal arrangement of uniformly-sized pores having diameters of at least about 13 Angstrom Units and exhibiting a hexagonal electron diffraction pattern that can be indexed with a $d_{100}$ value greater than about 18 Angstrom Units, comprising the steps of:

(a) crystallizing a mixture comprising sources of one oxide or a combination of oxides, an organic (R) directing agent, and solvent or solvent mixture, said oxides selected from the group consisting of divalent element W, trivalent element X, tetravalent element Y and pentavalent element Z, under conditions of pH, temperature and time to form a product comprising a M41S family molecular sieve and a mother liquor as a free fluid, wherein said mixture having a composition, in terms of mole ratios, within the following ranges:

| | |
|---|---|
| $X_2O_3/YO_2$ | 0.001 to 0.05 |
| $X_2O_3/(YO_2 + Z_2O_5)$ | 0.1 to 20 |
| $X_2O_3/(YO_2 + WO + Z_2O_5)$ | 0.1 to 20 |
| Solvent/$(YO_2 + WO + Z_2O_5 + X_2O_3)$ | 2 to 10 |
| $OH^-/YO_2$ | 0 to 10 |
| $M_{2/e}O/(YO_2 + WO + Z_2O_5 + X_2O_3)$ | 0 to 10 |
| $R_{2/f}O/(YO_2 + WO + Z_2O_5 + X_2O_3)$ | 0.01 to 2.0 | wherein e and f are the weighted average valences of M and R, respectively, M is an alkali or alkaline earth metal ion and R comprises an ion of the formula $R_1R_2R_3R_4Q^+$, wherein Q is nitrogen or phosphorus and wherein at least one of $R_1$, $R_2$, $R_3$ and $R_4$ is selected from the group consisting of aryl of from 6 to about 36 carbon atoms, alkyl of from 6 to about 36 carbon atoms and combinations thereof, the remainder of $R_1$, $R_2$, $R_3$ and $R_4$ being selected from the group consisting of hydrogen, alkyl of from 1 to 5 carbon atoms and combinations thereof;

(b) before steps of recovering and/or separating said M41S molecular sieve from the mother liquor, mixing at least a portion of said product comprising said M41S molecular sieve and said mother liquor as free fluid with a material to form said M41S composition of matter having less than 1 wt. % of said free fluid;

(c) extruding said M41S composition of matter to form a self-bound extrudate; and (d) calcining said self-bound extrudate under calcination conditions at a temperature in the range of 100° C. to 700° C. to form a self-bound MCM-41 catalyst having less than 1 wt. % of said free liquid.

14. The method of claim 13, further comprising the step of drying said M41S composition of matter before extruding step (c).

15. The method of claim 13, wherein said mixture of step (a) comprises an additional organic directing agent ion R of the formula $R_1R_2R_3R_4Q^+$, wherein $R_1$, $R_2$, $R_3$ and $R_4$ are selected from the group consisting of hydrogen, alkyl of 1 to 5 carbon atoms and combinations thereof.

16. The method of claim 13, wherein R comprises an organic agent selected from the group consisting of cetyltrimethylammonium, octadecyltrimethylammonium, benzyltrimethylammonium, cetylpyridinium, myristyltrimethylammonium, decyltrimethylammonium, dodecyltrimethylammonium and dimethyldidodecylammonium.

17. The method of claim 13, wherein said $R_1$, $R_2$, $R_3$ and $R_4$ are selected from the group consisting of —$C_6H_{13}$, —$C_{10}H_{21}$, —$C_{12}H_{25}$, —$C_{14}H_{29}$, —$C_{16}H_{33}$, —$C_{18}H_{37}$, and combinations thereof.

18. The method of claim 13, further comprising a step of adding to said mixture of step (a) an auxiliary organic selected from the group consisting of: (1) aromatic hydrocarbons and amines of from 5 to 20 carbons and halogen- and $C_1$-$C_{14}$ alkyl-substituted derivatives thereof; (2) cyclic aliphatic hydrocarbons and amines of from 5 to 20 carbons and halogen- and $C_1$-$C_{14}$ alkyl-substituted derivatives thereof; (3) polycyclic aliphatic hydrocarbons and amines of from 6 to 20 carbons and halogen- and $C_1$-$C_{14}$ alkyl-substituted derivatives thereof; (4) straight and branched aliphatic hydrocarbons and amines of from 3 to 16 carbons and halogen-substituted derivatives thereof; and (5) combinations thereof, and having a composition, in terms of mole ratios, within the following ranges:

| | |
|---|---|
| Auxiliary Organic/$YO_2$ | 0.05 to 20 |
| Auxiliary Organic/$R_{2/f}O$ | 0.02 to 100 |

19. The method of claim 18, wherein said auxiliary organic is selected from the group consisting of: pentane, hexane, heptane, octane, nonane, decane, dodecane, dihalooctane, p-xylene, trimethylbenzene, triethylbenzene, dimethyladamantane, benzene, alkyl-substituted benzene, alkyl-substituted adamantane, and combinations thereof, alkyl being of from 1 to about 14 carbon atoms.

20. The method of claim 13, wherein said Y is silicon and wherein said X is aluminum.

21. A hydrocarbon conversion process comprising the steps of:
(a) crystallizing a mixture comprising sources of one oxide or a combination of oxides, an organic (R) directing agent, and solvent or solvent mixture, said oxides selected from the group consisting of divalent element W, trivalent element X, tetravalent element Y and pentavalent element Z, under conditions of pH, temperature and time to form a product comprising a M41S family molecular sieve and a mother liquor as free fluid, said mixture having a composition, in terms of mole ratios, within the following ranges:

| | |
|---|---|
| $X_2O_3/YO_2$ | 0.001 to 0.05 |
| $X_2O_3/(YO_2 + Z_2O_5)$ | 0.1 to 20 |
| $X_2O_3/(YO_2 + WO + Z_2O_5)$ | 0.1 to 20 |
| Solvent/$(YO_2 + WO + Z_2O_5 + X_2O_3)$ | 2 to 10 |
| $OH^-/YO_2$ | 0 to 10 |
| $M_{2/e}O/(YO_2 + WO + Z_2O_5 + X_2O_3)$ | 0 to 10 |
| $R_{2/f}O/(YO_2 + WO + Z_2O_5 + X_2O_3)$ | 0.01 to 2.0 | wherein e and f are the weighted average valences of M and R, respectively, M is an alkali or alkaline earth metal ion and R comprises an ion of the formula $R_1R_2R_3R_4Q^+$, wherein Q is nitrogen or phosphorus and wherein at least one of $R_1$, $R_2$, $R_3$ and $R_4$ is selected from the group consisting of aryl of from 6 to about 36 carbon atoms, alkyl of from 6 to about 36 carbon atoms and combinations thereof, the remainder of $R_1$, $R_2$, $R_3$ and $R_4$ being selected from the group consisting of hydrogen, alkyl of from 1 to 5 carbon atoms and combinations thereof;

(b) before steps of recovering and/or separating said M41S molecular sieve from the mother liquor, mixing at least a portion of said product comprising said M41S molecular sieve and said mother liquor as free fluid with a material to form said M41S composition of matter having less than 1 wt. % of said free fluid;

(c) extruding said M41S family composition of matter to form an extrudate;

(d) calcining said extrudate under calcination conditions at a temperature in the range of 100° C. to 700° C. to form MCM-41 catalyst; and (e) thereafter contacting a hydrocarbon with said M41S catalyst to form a converted hydrocarbon.

22. The hydrocarbon conversion process of claim 21, further comprising the step of drying said M41S composition of matter before extruding step (c).

23. The hydrocarbon conversion process of claim 21, wherein said material is selected from the group consisting of metal oxides, metal nitrides, metal carbides, and mixtures thereof.

24. The hydrocarbon conversion process of claim 21, wherein said material is an absorptive material selected from the group consisting of carbon, silica-alumina-thoria, silica-alumina-zirconia, silica-thoria, silica-beryllia, silica-titania, silica-alumina-thoria, silica-alumina-zirconia silica-alumina-magnesia and silica-magnesia-zirconia, and mixtures thereof.

25. The hydrocarbon conversion process of claim 21, wherein said material is an adsorptive material selected from the group consisting of clays, silica, alumina, and mixtures thereof.

26. A hydrocarbon conversion process comprising the steps of:
(a) crystallizing a mixture comprising sources of one oxide or a combination of oxides, an organic (R) directing agent, and solvent or solvent mixture, said oxides selected from the group consisting of divalent element W, trivalent element X, tetravalent element Y and pentavalent element Z, under conditions of pH, temperature and time to form a product comprising a M41S family molecular sieve and a mother liquor, wherein said mixture having a composition, in terms of mole ratios, within the following ranges:

| | |
|---|---|
| $X_2O_3/YO_2$ | 0.001 to 0.05 |
| $X_2O_3/(YO_2 + Z_2O_5)$ | 0.1 to 20 |
| $X_2O_3/(YO_2 + WO + Z_2O_5)$ | 0.1 to 20 |

-continued

| | |
|---|---|
| Solvent/($YO_2$ + WO + $Z_2O_5$ + $X_2O_3$) | 2 to 10 |
| $OH^-$/$YO_2$ | 0 to 10 |
| $M_{2/e}O$/($YO_2$ + WO + $Z_2O_5$ + $X_2O_3$) | 0 to 10 |
| $R_{2/f}O$/($YO_2$ + WO + $Z_2O_5$ + $X_2O_3$) | 0.01 to 2.0 | wherein e and t are the weighted average valences of M and R, respectively, M is an alkali or alkaline earth metal ion and R comprises an ion of the formula $R_1R_2R_3R_4Q^+$, wherein Q is nitrogen or phosphorus and wherein at least one of $R_1$, $R_2$, $R_3$ and $R_4$ is selected from the group consisting of aryl of from 6 to about 36 carbon atoms, alkyl of from 6 to about 36 carbon atoms and combinations thereof, the remainder of $R_1$, $R_2$, $R_3$ and $R_4$ being selected from the group consisting of hydrogen, alkyl of from 1 to 5 carbon atoms and combinations thereof;

(b) before steps of recovering and/or separating said M41S molecular sieve from the mother liquor, mixing at least a portion of said product comprising said M41S molecular sieve and said mother liquor as free fluid with a material to form said M41S composition of matter having less than 1 wt. % of said free fluid;

(c) extruding said M41S composition of matter to form a self-bound extrudate;

(d) calcining said self-bound extrudate under calcination conditions at a temperature in the range of 100° C. to 700° C. to form a self-bound MCM-41 catalyst having less than 1 wt. % of said free fluid; and (e) thereafter contacting a hydrocarbon with said M41S catalyst to form a converted hydrocarbon.

27. The hydrocarbon conversion process of claim 26, further comprising the step of drying said M41S composition of matter before extruding step (b) step (c).

* * * * *